United States Patent [19]

Anetsberger et al.

[11] Patent Number: 4,508,026

[45] Date of Patent: Apr. 2, 1985

[54] BASKET MOVING MECHANISM FOR DEEP FAT FRYER

[75] Inventors: Richard J. Anetsberger; John A. Anetsberger, both of North Brook, Ill.

[73] Assignee: Anetsberger Brothers, Inc., Northbrook, Ill.

[21] Appl. No.: 516,632

[22] Filed: Jul. 25, 1983

[51] Int. Cl.³ .............................................. A47J 37/12
[52] U.S. Cl. ......................................... 99/407; 99/336
[58] Field of Search ................. 99/336, 407, 403, 410, 99/411, 417

[56] References Cited

U.S. PATENT DOCUMENTS

| | | | |
|---|---|---|---|
| 3,217,633 | 11/1965 | Anetsberger | 99/403 X |
| 3,273,488 | 9/1966 | Anetsberger | 99/336 X |
| 3,512,473 | 5/1970 | Moore et al. | 99/407 |
| 3,908,531 | 9/1975 | Morley | 99/407 X |

*Primary Examiner*—Billy J. Wilhite
*Attorney, Agent, or Firm*—McCaleb, Lucas & Brugman

[57] ABSTRACT

Deep fat fryer having plurality of food-supporting baskets, individual motor and switch controls for raising and lowering baskets mounted in forward lower portion of fryer casing to facilitate servicing thereof.

5 Claims, 5 Drawing Figures

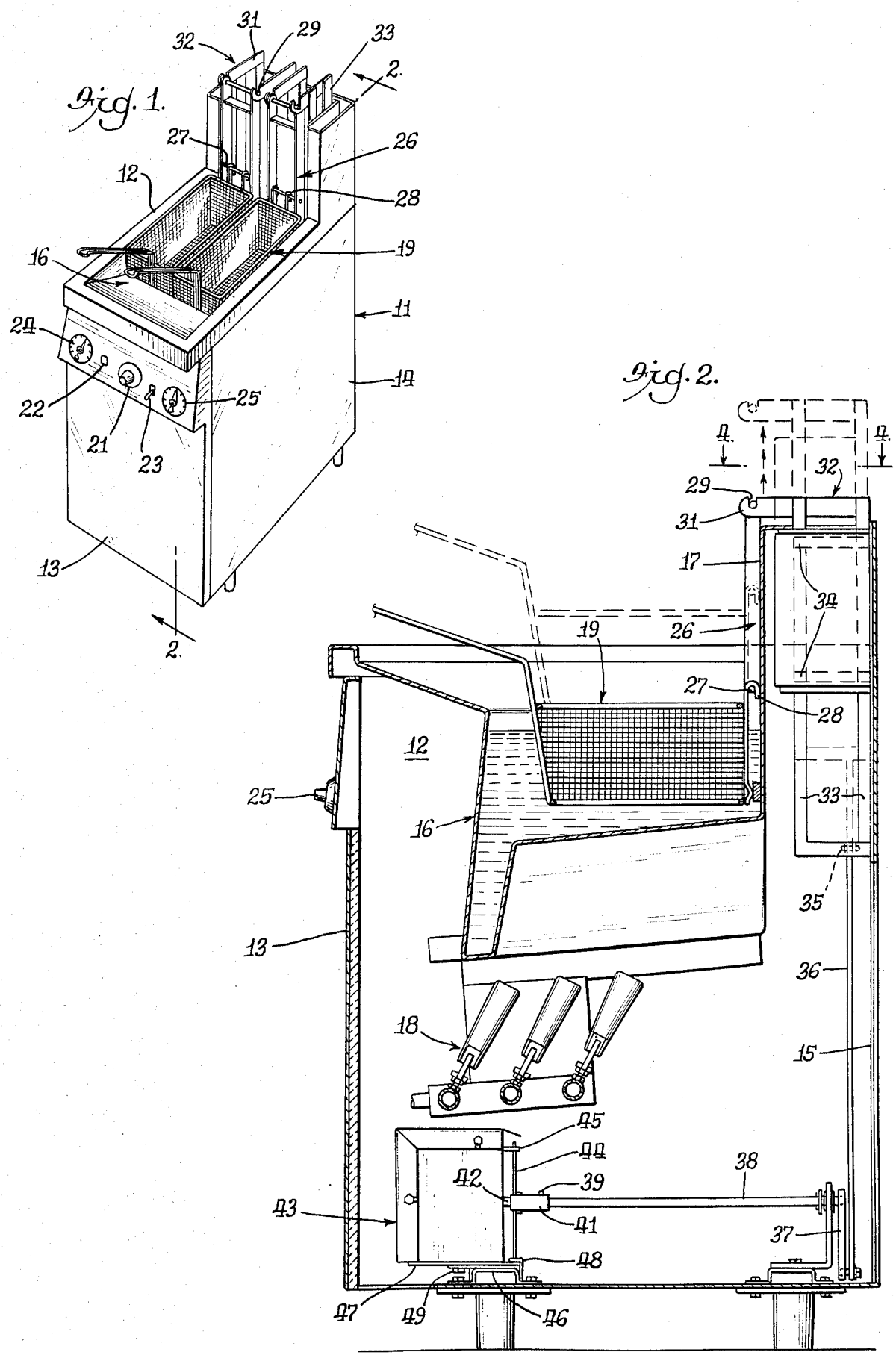

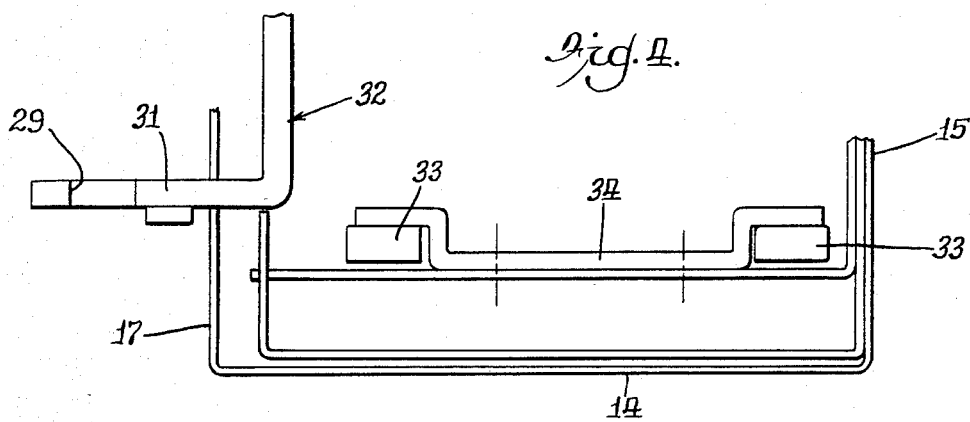
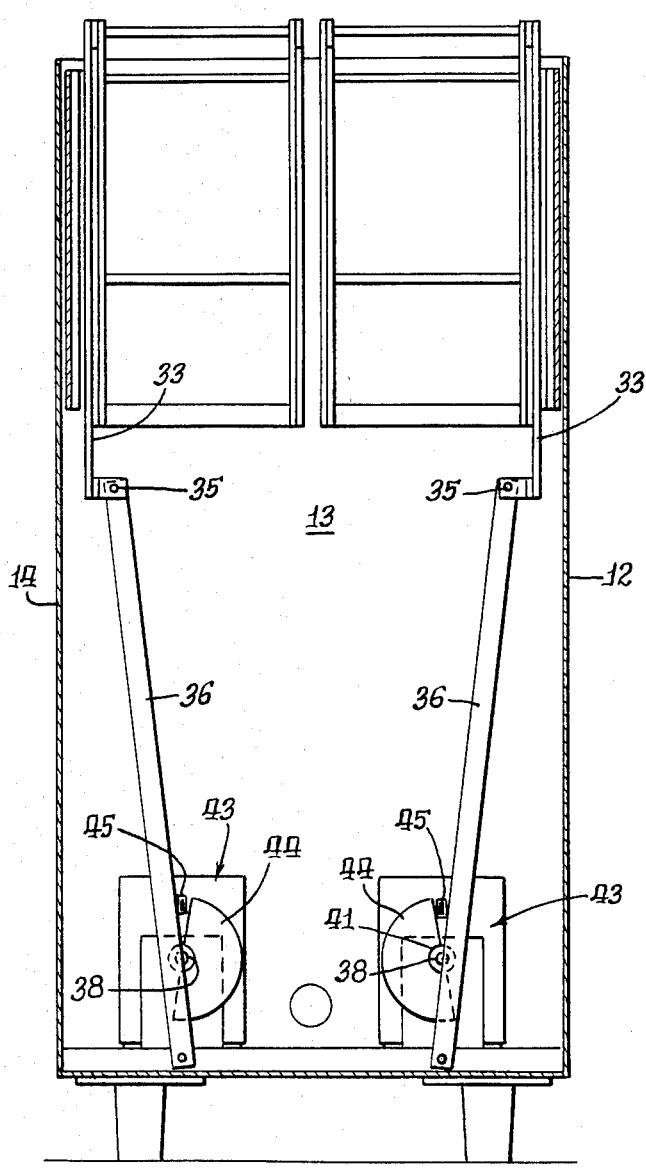
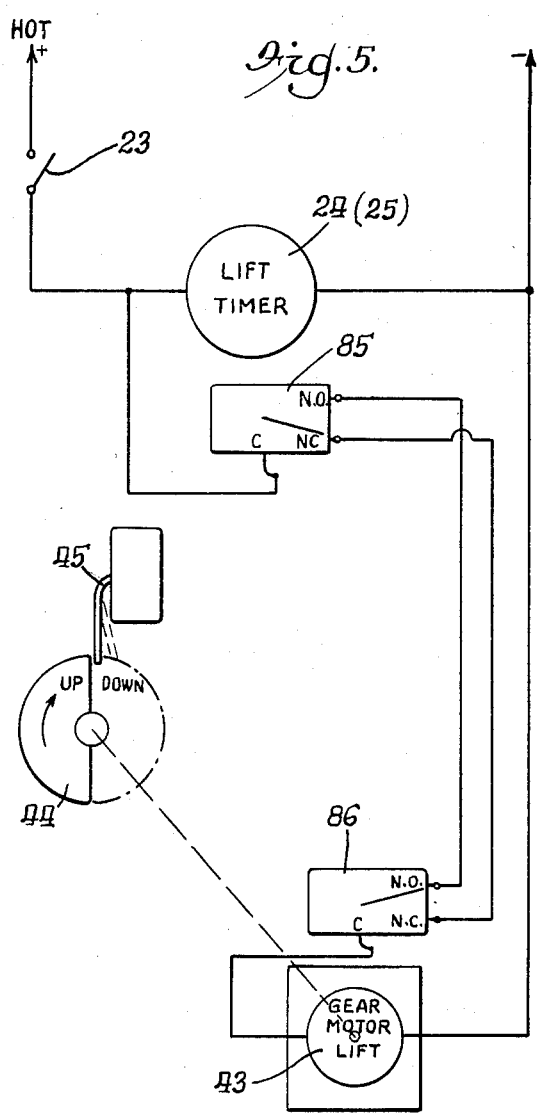

BASKET MOVING MECHANISM FOR DEEP FAT FRYER

BACKGROUND OF THE INVENTION

1. Field of the Invention

This invention relates generally to deep fat fryers, and more particularly to improvements in the lifting or lowering and raising mechanism for food-supporting baskets therein.

2. Description of the Prior Art

Basket lifting mechanisms have been provided in deep fat fryers, such as those of U.S. Pat. Nos. 3,217,633 and 3,273,488, but in all known prior art fryers the motor and switch control means have been mounted at the rear.

Thus, whenever servicing of a basket lift motor or switch is required, forward movement or displacement of the fryer is necessitated to gain access thereto. This completely disrupts use of the fryer, requires gas line disconnection where gas burners are used, and also prevents use of other fryers in a multiple or banked arrangement therewith, which is that usually employed. Consequently, servicing of a basket lift motor or switch normally must wait until after regular hours, which not only extends the non-use time of the fryer, but materially increases the cost due to overtime charges. And even if such usual fryer placement is not involved and the fryer may be moved forwardly without affecting operation of other fryers, servicing of the lift motor or switch of the fryer so displaced causes disruption of normal kitchen traffic or movement of cooking personnel.

SUMMARY OF THE INVENTION

This invention completely obviates all of the above-enumerated servicing difficulties by mounting the basket lifting motor and switch control means in the front end of the fryer casing so that servicing thereof may be accomplished without totally disrupting the cook's use of the fryer or others banked therewith. Consequently, the lift motor and control switch of a fryer can be serviced at any time of the day and without disconnection from the gas supply line where gas burners are employed. This constitutes a very important safety feature and avoids excessive down time. The novel location of the motor and switch means also enhances their life because the bottom front portion of the casing is the coolest part of the fryer. It should be noted as an added feature of the invention that the basket support and lifting mechanisms are so disposed at the rear of the fryer as to minimize its depth or overall front-to-rear dimension, as compared to those of the prior art. This is considered to be of critical importance in present commercial kitchen design.

In the drawings:

FIG. 1 is a perspective view of a deep fat fryer embodying the features of the invention;

FIG. 2 is a vertical sectional view taken substantially on the line 2—2 of FIG. 1 as seen from the right side of the fryer and showing the food supporting means in full lines in lowermost position;

FIG. 3 is a rear view of the fryer as seen from the right side of FIG. 2, with the casing shown in section;

FIG. 4 is a detail plan view of a rear corner portion of the fryer as seen along the line 4—4 of FIG. 2; and FIG. 5 is a wiring diagram of the electric circuit for the basket lifting mechanisms employed in the preferred embodiment of the instant fryer.

DESCRIPTION OF THE PREFERRED EMBODIMENT OF THE INVENTION

As in U.S. Pat. No. 3,273,488, reference numeral 11 indicates in general a deep fat fryer made up of an outer casing including a left side wall 12, front wall and door 13, right side wall 14 and rear wall 15 for supporting an open top kettle, indicated generally by reference numeral 16, which includes a rear wall 17. Suitable burner means 18 for heating the kettle 16, but forming no part of the instant invention, are illustrated in FIG. 2 as being similar to those shown in U.S. Pat. No. 3,217,633.

As earlier noted, the present invention is directed to novel control and operating mechanisms for food-supporting basket means which are shown as two in number and indicated generally by reference numerals 19. According to the usual practice, these baskets are lowered to immerse the food therein into fat in the kettle 16 heated by the burner means and lifted therefrom after a predetermined time period. Well-known thermostatic control means 21 mounted on a front wall panel is manually settable to control the operation of the burner means to maintain the cooking fat at any desired temperature. Also mounted on this panel are the usual heat indicating light 22, a master switch 23, and a pair of cycle timers 24 and 25 selectively settable to control, respectively, the immersion periods of the two food-supporting baskets 19 and including starting switches to initiate immersion of the baskets in the cooking fat in the kettle 16.

The two mechanisms employed for independently supporting, lowering and raising the baskets 19 are identical to each other, except that the one associated with the left-hand basket 19 is disposed adjacent the left wall 12 of the casing and extends inwardly therefrom, while that associated with the right-hand basket is disposed adjacent the right side wall 14 and extends therefrom toward the middle of the fryer. Consequently, only one of these basket raising mechanisms will be described and the same reference numerals will be applied to corresponding parts of both.

Each such basket lowering and lifting means comprises vertically slidable basket support means in the form of a hanger 26 including a cross rod 27 (FIGS. 1 and 2) on which the standard rearwardly extending hooks 28 on a food-supporting basket 19 may be engaged in well-known manner. An upper cross rod of the hanger 26 is removably disposed in, extends through, and is supported by suitable slots 29 in laterally spaced, forwardly extending upper arms 31 of a bracket 32. Each bracket 32 also includes two pairs of vertical arms 33, with the upper ends of each pair suitably connected, respectively, to one of the upper arms 31. The laterally outer pair of the vertical arms 33 of bracket 32, as best seen in FIG. 4, are guided and limited to vertical movements, as by the offset ends of suitable straps 34 mounted adjacent the associated casing side wall 12 or 14. Each of the brackets 32 is pivotally connected in any suitable manner, as shown at 35 in FIGS. 2 and 3, to the upper end of a lift rod 36 extending downwardly to the lower portion of the casing adjacent the rear wall 15.

A crank means is provided for raising and lowering the lift rod 36 which comprises a crank 37 pivotally attached at one end to the rod 36 and non-rotatably secured at its other end to the rear end of forwardly extending shaft means 38. The latter is non-rotatably secured by a pin-and-slot connection 39 (FIG. 2) at its forward end to a coupling 41 mounted on the rearwardly extending end of the shaft 42 of a food-support lifting and lowering motor means 43. Also secured to the motor shaft 42 by the coupling 41 is a switch control means in the form of a half-circular cam disc 44 which cooperates with a micro switch 45 mounted on the upper portion of the housing for the motor means 43.

In the normal at-rest or raised position of a food-supporting basket 19, its associated cam disc 44 is in its broken line position of FIG. 5 in which it maintains the micro switch 45 closed. As disclosed in detail in U.S. Pat. No. 3,217,633, when the starter button (therein designated 24 and herein 24 or 25) is actuated, a circuit is completed energizing the cycle timer motor and, at the same time, the lift motor 43 (therein 82) also is energized through a normally closed micro switch 85. This results in lowering of the associated food-supporting basket and allowing a micro switch 86 to close. When the basket reaches its lowest position in the kettle, cam disc 44 releases micro switch 45 allowing it to open and de-energize lift motor 43. The cycle is completed in wellknown manner when the end of the preset time interval is reached, and the lift motor 43 again is energized to return the associated food-supporting basket 19 to its raised position.

As previously explained herein, the novel placement of the motor means 43 and the switch control means 44, 45 in the most convenient and accessible place possible has several very important advantages over prior arrangements. In order to maximize the advantages, these parts are arranged and mounted so that they may be removed and replaced merely by releasing a single retaining or securing means or bolt. To this end, a motor unit pad structure or bracket means is provided for each motor means 43 which comprises a receiving base 46 (FIG. 2) for a base plate 47 on the motor, a flanged spring bracket 48 secured along the rear edge of, and spaced above, the base 46 to slidingly receive, and limit forward movement of, the plate 47, and a single bolt means 49 for securing the plate 47 to the base 46. Removal of the latter thus permits forward sliding of the entire unit 41–45 off its receiving base 46 and, if desired, immediate substitution therefor of another such unit, the only requirement respecting the latter step being the precaution to properly align the pin-and-slot connection 39 between the shaft means 38 and the coupling 41.

It is thought that the invention and many of its attendant advantages will be understood from the foregoing description, and it will be apparent that various changes may be made in the form, construction, and arrangement of the parts without departing from the spirit of the invention or sacrificing all of its material advantages, the form hereinbefore described and shown in the drawings being merely a preferred embodiment thereof.

The embodiments of the invention in which an exclusive property or privilege is claimed are defined as follows:

1. In a deep fat fryer having a kettle mounted in an outer casing, and food-supporting basket means for immersing food into, and removing the same from, said kettle; basket lowering and lifting means, comprising vertically slidable basket support means mounted at the rear of said casing, crank means rotatably mounted adjacent the lower end of said basket support means for moving the latter vertically, shaft means secured to said crank means for rotating the same and extending forwardly therefrom, motor means mounted in the lower front portion of said casing and connected to the forward end of said shaft means for rotating the same, and switch control means for said motor means mounted directly adjacent the latter.

2. In a deep fat fryer according to claim 1, bracket means for supporting said motor means mounted in the lower front portion of said casing, and readily removable securing means for attaching said motor means thereto.

3. A deep fat fryer according to claim 2, wherein said switch control means includes a switch mounted on said motor means and a control member therefor operable by said motor means.

4. In a deep fat fryer according to claim 3, wherein said motor means includes a motor shaft, a coupling for co-axially connecting the latter and said shaft means and carrying said control member for rotation therewith.

5. A deep fat fryer according to claim 4, wherein said coupling is freely separable from said shaft means by being slid longitudinally relative thereto, whereby removal and replacement of said motor and switch control means as a unit may be accomplished merely by removing said securing means.

* * * * *